US012539121B2

(12) United States Patent
Tinkham et al.

(10) Patent No.: US 12,539,121 B2
(45) Date of Patent: Feb. 3, 2026

(54) ANASTOMOSIS DEVICE WITH SENSOR FOR EXTRACORPOREAL SENSING AND MANIPULATION

(71) Applicant: G.I. Windows, Inc., Westwood, MA (US)

(72) Inventors: Brian P. Tinkham, Scituate, MA (US); Dane T. Seddon, Boston, MA (US); Michael Boutillette, Sudbury, MA (US); David Karasek, Waukesha, WI (US); Jonathan P. Boduch, Quincy, MA (US)

(73) Assignee: G.I. Windows, Inc., Westwood, MA (US)

( * ) Notice: Subject to any disclaimer, the term of this patent is extended or adjusted under 35 U.S.C. 154(b) by 0 days.

(21) Appl. No.: 18/982,707

(22) Filed: Dec. 16, 2024

(65) Prior Publication Data

US 2025/0186046 A1    Jun. 12, 2025

Related U.S. Application Data

(63) Continuation-in-part of application No. PCT/US2023/025597, filed on Jun. 16, 2023.

(60) Provisional application No. 63/353,419, filed on Jun. 17, 2022.

(51) Int. Cl.
*A61B 17/11* (2006.01)
*A61B 17/00* (2006.01)

(52) U.S. Cl.
CPC . *A61B 17/1114* (2013.01); *A61B 2017/00876* (2013.01)

(58) Field of Classification Search
CPC .............. A61B 17/11; A61B 17/1114; A61B 2017/1117; A61B 2017/1121; A61B 2017/1132; A61B 2017/1135; A61B 2017/1139

See application file for complete search history.

(56) References Cited

U.S. PATENT DOCUMENTS

| 10,779,831 B2 | 9/2020 | Lukin et al. |
| 10,874,397 B2 | 12/2020 | Beisel et al. |
| 2005/0143642 A1 | 6/2005 | Minai et al. |
| 2013/0253548 A1 | 9/2013 | Harrison et al. |
| 2014/0236200 A1 | 8/2014 | Beisel et al. |
| 2016/0022266 A1* | 1/2016 | Lukin ................. A61B 17/1114 606/154 |
| 2016/0262844 A1 | 9/2016 | Cohen et al. |
| 2017/0265866 A1 | 9/2017 | Ryou et al. |

(Continued)

FOREIGN PATENT DOCUMENTS

| JP | 2014188122 A | 10/2014 |
| JP | 2018061738 A | 4/2018 |

OTHER PUBLICATIONS

International Search Report and the Written Opinion of the International Searching Authority, for PCT Application No. PCT/US2023/025597, dated Nov. 8, 2023 (16 pages).

*Primary Examiner* — Tuan V Nguyen
(74) *Attorney, Agent, or Firm* — Nutter McClennen & Fish LLP

(57) ABSTRACT

The invention provides systems, devices, and methods for the delivery, deployment, and positioning of magnetic compression devices at a desired site so as to improve the accuracy of anastomoses creation between tissues, organs, or the like.

20 Claims, 11 Drawing Sheets

(56) References Cited

U.S. PATENT DOCUMENTS

2021/0169485 A1 6/2021 Beisel et al.
2022/0192671 A1 6/2022 Gagner et al.
2022/0323075 A1* 10/2022 Brahmstedt ............ A61B 17/11

* cited by examiner

System for Placing and Tracking Anastomosis Devices 10

- Access Device 14
- Delivery Device(s) 15, 100
- Magnetic Compression Anastomosis Device(s) 16, 200
- Imaging Modality 18
- Detector(s) 13
- Sensor(s) 17

ANASTOMOSIS DEVICE WITH SENSOR FOR EXTRACORPOREAL SENSING AND MANIPULATION

CROSS-REFERENCE TO RELATED APPLICATIONS

This patent application is a continuation-in-part of International Patent Application No. PCT/US2023/025597 entitled Anastomosis Device with Sensor for Extracorporeal Sensing and Manipulation filed Jun. 16, 2023, which claims the benefit of U.S. Provisional Patent Application No. 63/353,419 entitled Anastomosis Device with Sensor for Extracorporeal Sensing and Manipulation filed Jun. 17, 2022, each of which is hereby incorporated by reference herein in its entirety.

The subject matter of this patent application may be related to the subject matter of U.S. patent application Ser. No. 17/108,840 entitled SYSTEMS, DEVICES, AND METHODS FOR FORMING ANASTOMOSES filed Dec. 1, 2020, which is a continuation-in-part of, and therefore claims priority from, International Patent Application No. PCT/US2019/035202 having an International Filing Date of Jun. 3, 2019, which claims the benefit of, and priority to, U.S. Provisional Application Ser. No. 62/679,810, filed Jun. 2, 2018, U.S. Provisional Application Ser. No. 62/798,809, filed Jan. 30, 2019, and U.S. Provisional Application Ser. No. 62/809,354, filed Feb. 22, 2019, the contents of each of which are hereby incorporated by reference herein in their entireties.

FIELD OF THE INVENTION

The invention relates to the tracking and recovery of deployable magnetic compression devices, and, more particularly, to systems, devices, and methods for detecting the position of magnetic compression devices following the delivery, deployment, and positioning of magnetic compression devices at a desired site so as to improve the accuracy of the location of magnetic compression anastomosis creation between tissues, organs, or the like, as well as the tracking of the location of the magnetic compression devices following completion of the anastomosis procedure.

BACKGROUND

Bypasses of the gastroenterological (GI), cardiovascular, or urological systems are typically formed by cutting holes in tissues at two locations and joining the holes with sutures or staples. A bypass is typically placed to route fluids (e.g., blood, nutrients) between healthier portions of the system, while bypassing diseases or malfunctioning tissues. The procedure is typically invasive, and subjects a patient to risks such as bleeding, infection, pain, and adverse reaction to anesthesia. Additionally, a bypass created with sutures or staples can be complicated by post-operative leaks and adhesions. Leaks may result in infection or sepsis, while adhesions can result in complications such as bowel strangulation and obstruction. While traditional bypass procedures can be completed with an endoscope, laparoscope, or robot, it can be time consuming to join the holes cut into the tissues. Furthermore, such procedures require specialized expertise and equipment that is not available at many surgical facilities.

As an alternative to sutures or staples, surgeons can use mechanical couplings or magnets to create a compressive anastomosis between tissues. For example, compressive couplings or paired magnets can be delivered to tissues to be joined. Because of the strong compression, the tissue trapped between the couplings or magnets is cut off from its blood supply. Under these conditions, the tissue becomes necrotic and degenerates, and at the same time, new tissue grows around points of compression, e.g., on the edges of the coupling. With time, the coupling can be removed, leaving a healed anastomosis between the tissues.

Nonetheless, the difficulty of placing the magnets or couplings limits the locations that compressive anastomosis can be used. In most cases, the magnets or couplings have to be delivered as two separate assemblies, requiring either an open surgical field or a bulky delivery device. For example, existing magnetic compression devices are limited to structures small enough to be deployed with a delivery conduit e.g., an endoscopic instrument channel or laparoscopic port. When these smaller structures are used, the formed anastomosis is small and suffers from short-term patency. Furthermore, placement of the magnets or couplings can be imprecise, which can lead to anastomosis formation in locations that is undesirable or inaccurate.

Thus, there still remains a clinical need for reliable devices and minimally-invasive procedures that facilitate compression anastomosis formation between tissues in the human body.

SUMMARY

The present invention provides improved devices and techniques for minimally-invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer.

In accordance with one embodiment of the invention, a system for placing and tracking one or more magnetic compression anastomosis devices at a desired target site within a patient includes a delivery device. The delivery device includes an elongate body including a lumen extending entirely therethrough and shaped and/or sized to receive and allow one or more magnetic compression anastomosis devices to pass therethrough.

The system for placing and tracking one or more magnetic compression anastomosis devices also includes one or more magnetic compression anastomosis devices disposed within the lumen. Each of the one or more magnetic compression anastomosis devices includes a pair of magnetic segments coupled together via a flexible exoskeleton element. The one or more magnetic compression anastomosis devices include articulating magnets.

The system for placing and tracking one or more magnetic compression anastomosis devices also includes a tracking device including one or more detectors that detect the one or more magnetic compression anastomosis devices.

In some embodiments, the one or more detectors may be external to the patient. The one or more detectors may include a wearable sash that is worn on the body of the patient. The wearable sash may include one or more discreet detectors that detect a signal. In some embodiments, the one or more detectors may include a detector array that includes one or more discreet detectors that are attached to the body of the patient to detect a signal. The one or more detectors may detect a magnetic field produced by the articulating magnets. The one or more detectors include discreet detectors that include Hall effect measurement devices.

The one or more magnetic compression anastomosis devices may further include one or more sensors. The one or more sensors may produce an output signal that can be detected by the one or more detectors. The one or more sensors may include at least one wireless transmitter. The output signals may be transmitted to the one or more detectors via wireless communication The one or more sensors may include at least one of: an accelerometer; a force sensitive resistor; a photocell; an infra-red sensor; an ambient pressure sensor; a temperature sensor; a pH sensor; a sonic sensor; a humidity sensor; an electromyography sensor; a magnetic field sensor; a chemical sensor; or a gas sensor.

The one or more detectors may externally detect a presence of a magnetic compression anastomosis device by measuring reflected millimeter wave energy. The one or more detectors may externally detect a presence of a magnetic compression anastomosis device using ionizing radiation or non-ionizing radiation.

In some embodiments, an output of the one or more sensors may collected by a computer system that stores the detected signals. The computer system may provide a display of the output signal of the one or more sensors. The display of the output of the one or more sensors may be viewable on a handheld device. The handheld device may be at least one of a mobile phone, a tablet computer, or a mobile reading device.

In some embodiments, at least one magnetic compression anastomosis device may include a wireless receiver. At least one magnetic compression anastomosis device may include one or more actuators controlled remotely from the tracking device using wireless communication technology.

The one or more actuators may be configured to do at least one of: controlling formation of the magnetic compression anastomosis device; controlling bringing two or more magnetic compression anastomosis devices into proximity with each other; controlling the mating of two or more magnetic compression anastomosis devices; controlling decoupling of two or more magnetic compression anastomosis devices; controlling coupling of two or more magnetic compression anastomosis devices; deploying coupling devices; activating an electromagnet; activating a heating element; dispensing a chemical; or actuating a piercing or cutting tool.

The detectors may detect that two or more magnetic compression anastomosis devices the devices are coupled; The detectors may detect that two or more magnetic compression anastomosis devices the devices are decoupled.

A distance between two or more magnetic compression anastomosis devices may determine the distance between two or more magnetic compression anastomosis devices is reduced as an anastomosis is formed. The distance between two or more magnetic compression anastomosis devices can be used to predict when the devices will fall away and/or exit the body.

A magnetic stack including at least one portion of tissue compressed between two magnetic compression anastomosis devices may be tracked.

At least one magnetic compression anastomosis device may include a plurality of articulating magnets.

The plurality of articulating magnets may be configured to self-assemble from a linear arrangement into a circle or polygon.

At least one magnetic compression anastomosis device includes a plurality of magnets disposed in an exoskeleton. The exoskeleton may include at least one sensor.

In accordance with another embodiment of the invention, a method for placing and tracking one or more magnetic compression anastomosis device within a patient includes using an elongate body including a lumen extending entirely therethrough and shaped and/or sized to receive and allow one or more magnetic compression anastomosis devices to pass therethrough, and a distal portion extending from the elongate hollow body. The distal portion includes a pair of arms extending from the elongate hollow body. Each arm terminates at a respective distal end. The respective distal ends converge with one another to form a substantially unitary tip configured to penetrate tissue. The pair of arms cooperatively form a slot in fluid communication with the lumen of the elongate body.

The method for placing and tracking one or more magnetic compression anastomosis devices within a patient also includes tracking the one or more magnetic compression anastomosis devices using a tracking device. The tracking device includes one or more detectors that detect the one or more magnetic compression anastomosis devices.

In some embodiments, each of the one or more magnetic compression anastomosis devices may further include one or more additional pairs of magnetic segments coupled together via a flexible exoskeleton element to form a set of articulating magnets. The set of articulating magnets may form a closed geometric shape. The closed geometric shape may be a polygon with at least three sides.

The tracking device may further include one or more sensors disposed on the one or more magnetic compression anastomosis devices. The one or more sensors may produce an output signal that can be detected by the one or more detectors. The one or more sensors may include at least one of: an accelerometer; a force sensitive resistor; a photocell; an infra-red sensor; an ambient pressure sensor; a temperature sensor; a pH sensor; a sonic sensor; a humidity sensor; a electromyography sensor; a magnetic field sensor; a chemical sensor; or a gas sensor.

In some embodiments, the one or more detectors may detect the output signal of the one or more sensors. A location of the one or more magnetic compression anastomosis devices within the patient may be determined from the output signal of the one or more sensors.

In some embodiments, tracking the one or more magnetic compression anastomosis devices includes repeatedly determining the location of the one or more magnetic compression anastomosis devices within the patient at regular intervals over a given duration. The regular intervals may include a first time period of between 1 second and 24 hours. The given duration may include a second time period of between 1 day and 14 days.

The method for placing and tracking one or more magnetic compression anastomosis devices within a patient may also include determining that the one or more magnetic compression anastomosis devices has proceeded to exit the patient. In some embodiments, the determination may be made when the one or more detectors fail to detect any of the one or more magnetic compression anastomosis devices; or any of the one or more sensors.

In accordance with another embodiment of the invention, a method of anastomosis between tissues in a patient includes placing a first magnetic compression anastomosis device adjacent to a first portion of tissue and placing a second magnetic compression anastomosis device adjacent to a second portion of tissue. The method further includes bringing the first magnetic compression anastomosis device and the second magnetic compression anastomosis device into proximity with each other. A first distance between the first magnetic compression anastomosis device and the second magnetic compression anastomosis device when they are in proximity with each other may be between 10 cm and 1 cm.

The method of anastomosis between tissues in a patient also includes mating the first magnetic compression anastomosis device and the second magnetic compression anastomosis device to bring the first portion of tissue and the second portion of tissue together, thus forming a magnetic stack. A distance between the first magnetic compression anastomosis device and the second magnetic compression anastomosis device when they are mated with each other may be between 10 mm and 2 mm. The mated first magnetic compression anastomosis device and the second magnetic compression anastomosis device circumscribes the first tissue and the second tissue. The magnetic stack comprises: the first magnetic compression anastomosis device; the first portion of tissue adjacent the first magnetic compression anastomosis device; the second portion of tissue adjacent the first portion of tissue; and the second magnetic compression anastomosis device adjacent the second portion of tissue. Thus, the first and second tissues are compressed between the first and second magnetic compression anastomosis devices.

The method of anastomosis between tissues in a patient also includes allowing the first portion of tissue and the second portion of tissue circumscribed by the first magnetic compression anastomosis device and the second magnetic compression anastomosis device in the magnetic stack to necrose and degrade. A distance between the first magnetic compression anastomosis device and the second magnetic compression anastomosis device when the first and second tissues are necrosed and degraded may be between 2 mm and 0.5 mm.

The method of anastomosis between tissues in a patient further includes allowing the magnetic stack to fall away from the necrosed and degraded tissues of the patient and proceed to exit the patient.

The first and second magnetic compression anastomosis devices are articulated. The articulated first and second magnetic compression anastomosis devices are straight or are curved.

The articulated first and second magnetic compression anastomosis devices may form a closed geometric shape. The closed geometric shape may be a polygon with at least three sides.

The method of anastomosis between tissues in a patient may further include tracking the magnetic stack using a tracking device. The tracking device may further include one or more detectors that detect the one or more magnetic compression anastomosis devices. The one or more sensors may be disposed on the one or more magnetic compression anastomosis devices. The one or more sensors may produce an output signal that can be detected by the one or more detectors. The one or more sensors may include at least one of: an accelerometer; a force sensitive resistor; a photocell; an infra-red sensor; an ambient pressure sensor; a temperature sensor; a pH sensor; a sonic sensor; a humidity sensor; a electromyography sensor; a magnetic field sensor; a chemical sensor; or a gas sensor.

The method of anastomosis between tissues in a patient may further include determining that the magnetic stack has proceeded to exit the patient. The determination may be made when the one or more detectors fail to detect the magnetic stack, or any of the one or more sensors.

In some embodiments, the placing of the first and second magnetic compression anastomosis devices at the first and second target sites adjacent to the first and second portions of tissue, respectively, in the patient may be based on a visual depiction of the location of the first and second target sites as provided by an imaging modality. The imaging modality may include at least one of a medical imaging procedure, wavelength detection, X-ray-based imaging, illumination, computed tomography, radiography, and fluoroscopy, or a combination thereof. The medical imaging procedure may include ultrasound.

In accordance with another embodiment of the invention, a magnetic compression anastomosis device is configured to be delivered within a patient for forming an anastomosis within the patient, includes one or more sensors that produce output signals that can be detected by one or more detectors external to the patient. The one or more sensors may include at least one wireless transmitter, and the output signals are transmitted to the one or more detectors via wireless communication. The one or more sensors may include at least one of: an accelerometer; a force sensitive resistor; a photocell; an infra-red sensor; an ambient pressure sensor; a temperature sensor; a pH sensor; a sonic sensor; a humidity sensor; an electromyography sensor; a magnetic field sensor; a chemical sensor; or a gas sensor.

The one or more detectors may externally detect a presence of a magnetic compression anastomosis device by measuring reflected millimeter wave energy. The one or more detectors may externally detect a presence of a magnetic compression anastomosis device using ionizing radiation or non-ionizing radiation.

An output of the one or more sensors may be collected by a computer system that stores the detected signals. The computer system may provide a display of the output signal of the one or more sensors. The display of the output of the one or more sensors may be viewable on a handheld device. The handheld device may include at least one of a mobile phone, a tablet computer, or a mobile reading device.

At least one magnetic compression anastomosis device may include a wireless receiver. At least one magnetic compression anastomosis device may include one or more actuators controlled remotely from the tracking device using wireless communication technology. The one or more actuators may include at least one of: controlling formation of the magnetic compression anastomosis device; controlling bringing two or more magnetic compression anastomosis devices into proximity with each other; controlling the mating of two or more magnetic compression anastomosis devices; controlling decoupling of two or more magnetic compression anastomosis devices; controlling coupling of two or more magnetic compression anastomosis devices; deploying coupling devices; activating an electromagnet; activating a heating element; dispensing a chemical; or actuating a piercing or cutting tool.

The detectors may detect that two or more magnetic compression anastomosis devices are coupled. The detectors may detect that two or more magnetic compression anastomosis devices are decoupled.

A distance between two or more magnetic compression anastomosis devices may be determined. The distance between two or more magnetic compression anastomosis devices may be reduced as an anastomosis is formed. The distance between two or more magnetic compression anastomosis devices may be used to predict when the devices will fall away and/or exit the body.

In some embodiments, a magnetic stack comprising at least one portion of tissue compressed between two magnetic compression anastomosis devices may be tracked.

At least one magnetic compression anastomosis device includes a plurality of articulating magnets. The plurality of articulating magnets may be configured to self-assemble from a linear arrangement into a circle or polygon. At least one magnetic compression anastomosis device may include a plurality of magnets disposed in an exoskeleton. The exoskeleton may include at least one sensor.

More specifically, the invention provides various systems, devices, and methods for detecting the position of magnetic compression anastomosis devices following the delivery, deployment, and positioning of the magnetic compression anastomosis devices at a desired site so as to improve the accuracy of anastomoses creation between tissues, organs, or the like. Furthermore, the invention provides for the tracking of the magnetic compression anastomosis devices through the body of the patient up to and including elimination of the magnetic devices. The systems, devices, and methods of the present invention include, but are not limited to, various access devices for accessing a hollow body of the patient, such as a gall bladder, and securing positioning of the access device for the subsequent placement of one of a pair of magnetic anastomosis compression devices and the precise detection of the location of the magnetic devices. The systems, devices, and methods of the present invention further include various delivery devices for delivering at least one of the pair of magnetic anastomosis compression devices to the target site, wherein, in some instances, a delivery device consistent with the present disclosure may assist in the deployment of at least one of the pair of magnetic anastomosis compression devices and subsequent securing to the target site and/or coupling the pair of magnetic anastomosis compression devices to one another. The systems, devices, and methods of the present invention include various embodiments of magnetic anastomosis compression devices and various designs for transitioning from a compact delivery configuration to a larger deployed configuration, generally by way of self-assembling design.

For example, in one aspect, the invention provides a system including a delivery device for introducing and delivering, via a minimally-invasive technique, a pair of magnetic assemblies between adjacent organs to bridge walls of tissue of each organ together to thereby form a passage therebetween (i.e., an anastomosis). The delivery device is particularly useful in delivering the pair of magnetic assemblies to a target site within the gastrointestinal tract to thereby form anastomosis between gastric and gall bladder walls to provide adequate drainage from the gallbladder when blockage is occurring (due to disease or other health-related issues).

In the embodiments described herein, the system generally includes a single scope, such as an endoscope, laparoscope, catheter, trocar, or other access device, through which a delivery device is advanced to a target site for delivering and positioning a pair of magnetic assemblies for subsequent formation of anastomosis at the target site. In particular, the delivery device comprises an elongate hollow body, such as a catheter, shaped and/or sized to fit within the scope. The delivery device includes a working channel in which a pair of magnetic assemblies is loaded. The delivery device further includes a distal end configured to pierce, or otherwise penetrate, through tissue. For example, the distal end may have a sharp tip for piercing tissue and/or may utilize energy to penetrate through tissue (i.e., a hot tip). The body of the delivery device further includes a slot or opening adjacent to the distal tip. The slot is shaped and/or sized to receive the magnetic assemblies therethrough, such that the magnetic assemblies pass through the working channel and exit the delivery device via the slot. The delivery device further includes a placement member, generally in the form of a wire or the like, that is releasably coupled to one or both of the magnetic assemblies and provide a means of deploying the magnetic assemblies from the distal end of the delivery device via the slot.

During a procedure, a surgeon or other trained medical professional may advance a scope (e.g., endoscope) within a hollow body of the patient and position the scope at a desired anatomical location for formation of the anastomosis based on either a visual depiction of the location of the target site as provided by an imaging modality providing a medical imaging procedure (e.g., ultrasound (US), wavelength detection, X-ray-based imaging, illumination, computed tomography (CT), radiography, and fluoroscopy, or a combination thereof). The surgeon may advance the distal tip of the delivery device through adjacent walls of a pair of organs (i.e., through a wall of the duodenum and a wall of the common bile duct). Upon advancing distal end, including the slot, into the first organ (i.e., common bile duct), the surgeon may utilize the placement member to manually deliver and deploy a first magnetic assembly into the first organ via the slot. It should be noted that each magnetic assembly comprises a pair of magnetic segments generally arranged in a linear alignment with one another (e.g., aligned in an end-to-end fashion) and coupled together via a flexible exoskeleton element, wherein the segments are spaced apart via a central portion of the exoskeleton. The exoskeleton may be made from a resilient material that will retain its shape after deformation, such as a polymer or metal alloy. As such, deployment of the first magnetic assembly results in the pair of magnetic segments to exit the slot on opposite respective sides of the body of the delivery device while the central portion of the exoskeleton remains within the slot. In other words, the slot extends entirely through the body of the delivery device, from one side to the other.

At this point, the surgeon need only pull back upon the delivery device until the first magnetic assembly engages the tissue of the first organ and the majority of the slot is positioned within the second organ. The surgeon is able to then deliver and deploy the second magnetic assembly into the second organ (i.e., the duodenum). The second magnetic assembly deploys in a similar fashion as the first magnetic assembly, in that magnetic segments of the second magnetic assembly exit the slot on opposite respective sides of the body of the delivery device while a central portion of an exoskeleton remains within the slot. In turn, the first and second magnetic assemblies are substantially aligned with one another and, due to attractive magnetic forces, the first and second magnetic assemblies will couple to one another. The distal end of the delivery device is comprised of two halves that, when in a default state, form a relatively uniform tip shape. However, the distal end comprises a deformable material (i.e., shape memory material), such that, upon application of sufficient force, the two halves will split apart. As such, once both the first and second magnetic assemblies have been delivered and are effectively coupled to one another (but are still retained within the slot), the surgeon need only pull back on the delivery device which then causes the magnets to make contact with the distal tip and force the two halves of the distal tip to split apart, allowing the distal end of the delivery device to be withdrawn from the target site while the pair of magnetic assemblies remain in place. The pair of magnetic assemblies compress the walls of each respective organ therebetween, subsequently forming an anastomosis between the organs (i.e., anastomosis between the duodenum and the common bile duct).

As such, upon deployment, each magnetic assembly has a width and a length generally corresponding to a width of a respective segment and a length that is approximately twice the length of each segment. As a result, the pair of magnetic assemblies, when coupled to one another, generally form a substantially linear package and the resulting anastomosis formed may generally be rectangular in shape, but may naturally form a round or oval shape. The resulting anastomosis may have a 1:1 aspect ratio relative to the dimensions of the magnetic assemblies. However, the present invention allows for larger aspect ratios (i.e., a larger anastomosis to form relative to the dimensions of the magnetic assemblies). In particular, prior art systems and methods that include the use of magnets for creating anastomosis are generally limited based on the dimensions of the working channel of the scope or catheter used for delivering such magnets, which, in turn, limits the resulting size of the anastomosis. However, the magnetic assembly design of the present invention overcomes such limitations. For example, the design of the magnetic assembly of the present invention, notably the coupling of multiple magnetic segments to one another via an exoskeleton, allow for any number of segments to be included in a single assembly, and thus the resulting anastomosis has a greater size relative to the dimensions of the working channel of the scope. For example, in some embodiments, the resulting anastomosis may include an aspect ratio in the range of 2:1 to 10:1 or greater.

Accordingly, the delivery device of the present disclosure produces a low-profile linear anastomosis that would allow certain complications, particularly those associated with blockage of the common bile duct, to be mitigated.

BRIEF DESCRIPTION OF THE DRAWINGS

Features and advantages of the claimed subject matter will be apparent from the following detailed description of embodiments consistent therewith, which description should be considered with reference to the accompanying drawings.

Figure 1:
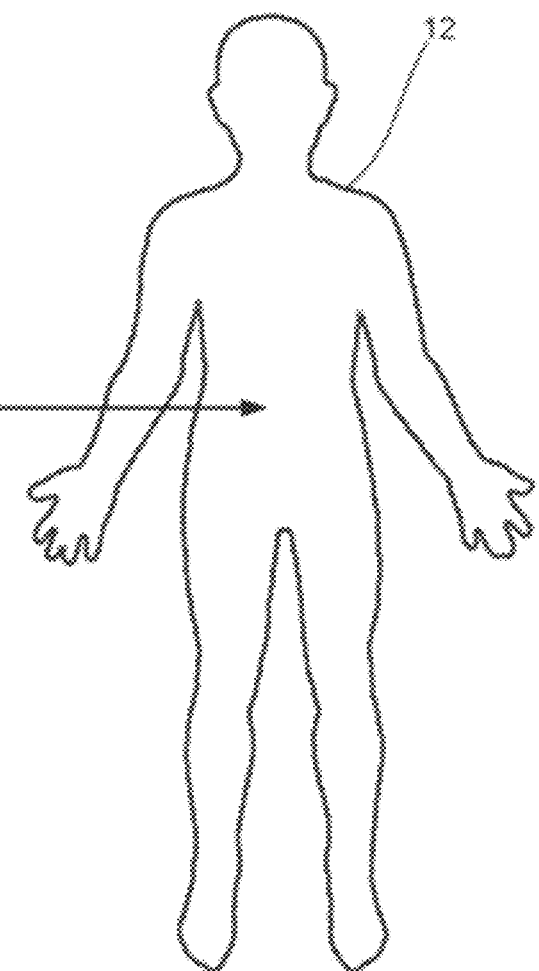
FIG. 1 is a schematic illustration of an anastomosis formation system consistent with the present disclosure, in accordance with various exemplary embodiments.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

Exemplary embodiments provide improved devices and techniques for minimally-invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer.

The system generally includes an access device configured to be provided within a hollow body of a patient and assist in the formation of an anastomosis at a target site (a desired anatomical location) within the hollow body for formation of an anastomosis between a first portion of tissue of the hollow body at the target site and a second portion of tissue of the hollow body. The access device is configured to provide access to the first and second portions of tissue of the hollow body and further deliver and position first and second implantable magnetic anastomosis devices relative to the first and second portions of tissue or adjacent tissue for the formation of an anastomosis between tissues at the target site. The first and second implantable magnetic anastomosis compression devices are configured to be magnetically attracted to one another through a defined tissue area of the combined thickness of a wall of the tissues at the target site and exert compressive forces on the defined area to form the anastomosis.

The systems, devices, and methods described herein include, but are not limited to, various access devices for accessing a hollow body of the patient, such as a gall bladder, and securing positioning of the access device for the subsequent placement of one of a pair of magnetic anastomosis compression devices. The systems, devices, and methods described herein further include various delivery devices for delivering at least one of the pair of magnetic anastomosis compression devices to the target site, wherein, in some instances, a delivery device consistent with the present disclosure may assist in the deployment of at least one of the pair of magnetic anastomosis compression devices and subsequent securing to the target site and/or coupling the pair of magnetic anastomosis compression devices to one another. The systems, devices, and methods described herein include various embodiments of magnetic anastomosis compression devices and various designs for transitioning from a compact delivery configuration to a larger deployed configuration, generally by way of self-assembling design.

More specifically, exemplary embodiments provide a system including a delivery device for introducing and delivering, via a minimally-invasive technique, a pair of magnetic assemblies between adjacent organs to bridge walls of tissue of each organ together to thereby form a passage therebetween (i.e., an anastomosis). The delivery device is particularly useful in delivering the pair of magnetic assemblies to a target site within the gastrointestinal tract to thereby form anastomosis between gastric and gall bladder walls to provide adequate drainage from the gallbladder when blockage is occurring (due to disease or other health-related issues).

The systems, devices, and methods described herein include, but are not limited to, various methods systems, and devices for placing, locating, and tracking the deployed magnetic compression anastomosis devices. Additionally, or alternatively, one or more sensors may be included as part of the magnetic compression anastomosis device to produce signals that can be detected by and/or transmitted to an extracorporeal device (e.g., detector).

Accordingly, exemplary embodiments provide improved devices and techniques for minimally invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer.

FIG. 1 is a schematic illustration of system for placing and tracking one or more magnetic compression anastomosis devices 10 for providing improved placement of magnetic anastomosis devices (e.g., magnetic compression anastomosis devices) at a desired site so as to improve the accuracy of anastomoses creation between tissues within a patient 12. The system 10 generally includes an access device 14, a delivery device 15, 100, magnetic anastomosis compression devices 16, 200, an imaging modality 18, one or more detectors 13, and one or more sensors 17.

The access device 14 may generally include a scope, including, but not limited to, an endoscope, laparoscope, catheter, trocar, or other delivery device. For most applications described herein, the access device 14 is an endoscope, including a delivery needle configured to deliver the magnetic anastomosis devices 16, 200. Accordingly, the system 10 of the present disclosure relies on a single endoscope 14 for the delivery of the two magnetic compression devices 16, 200. As will be described in greater detail herein, a surgeon may advance the endoscope 14 within a hollow body of the patient 12 and position the endoscope 14 at the desired anatomical location for formation of the anastomosis based on a visual depiction of the location of the target site as provided by an imaging modality. For example, the imaging modality may include a display in which an image, or other visual depiction, is displayed to the surgeon illustrating a target site when performing a medical imaging procedure, including, but not limited to, ultrasound (US), wavelength detection, X-ray-based imaging, illumination, computed tomography (CT), radiography, and fluoroscopy, or a combination thereof. The surgeon may then rely on such a visual depiction when advancing the endoscope through the hollow body so as to position the access device 14 at a portion of tissue adjacent to the other portion of tissue at the target site, thereby ensuring the placement of the magnetic devices 16, 200 is accurate.

The anastomosis formation system 10 may further include one or more detectors 13 to detect the presence and location of the magnetic anastomosis. Therefore, certain exemplary embodiments include an extracorporeal device that allows for detecting the presence or absence of a magnetic compression anastomosis device within a body and optionally also detecting the position of the magnetic compression anastomosis device within the body and/or sensing any of various types of parameters associated with the magnetic compression anastomosis device and/or the body.

In some cases, sensing of the magnetic compression anastomosis device within the body can be performed without any additional capabilities being added to the magnetic compression anastomosis device, such as detecting the magnetic field or magnetic flux produced by the magnetic compression anastomosis device. Detecting such magnetic field or magnetic flux may be accomplished by using a Hall sensor or other magnetic field sensor or magnetometer. Additionally, the magnetic compression anastomosis device may itself be detected using a metal detector, transmitting millimeter wave energy and detecting reflected millimeter wave energy, transmitting ionizing or non-ionizing radiation and detecting reflected energy, or stimulating and detecting magnetic resonance such as by use of magnetic resonance imaging.

Additionally, or alternatively, one or more sensors may be included as part of the magnetic compression anastomosis device to produce signals that can be detected by and/or transmitted to the extracorporeal device. For example, using any of a variety of wireless communication technologies, such as devices having near-field communication (NFC) technology, radio frequency identification (RFID) technology, and/or Bluetooth technology. An extracorporeal device can be configured to detect and receive signals from any of the wireless communication devices above. The extracorporeal device could be any type of device such as a medical device, a smartphone, a tablet computer, or other processing device.

It should be noted that the hollow body through which the access device 14 may pass includes, but is not limited to, the stomach, gallbladder, pancreas, duodenum, small intestine, large intestine, bowel, vasculature, including veins and arteries, or the like.

Figure 2:
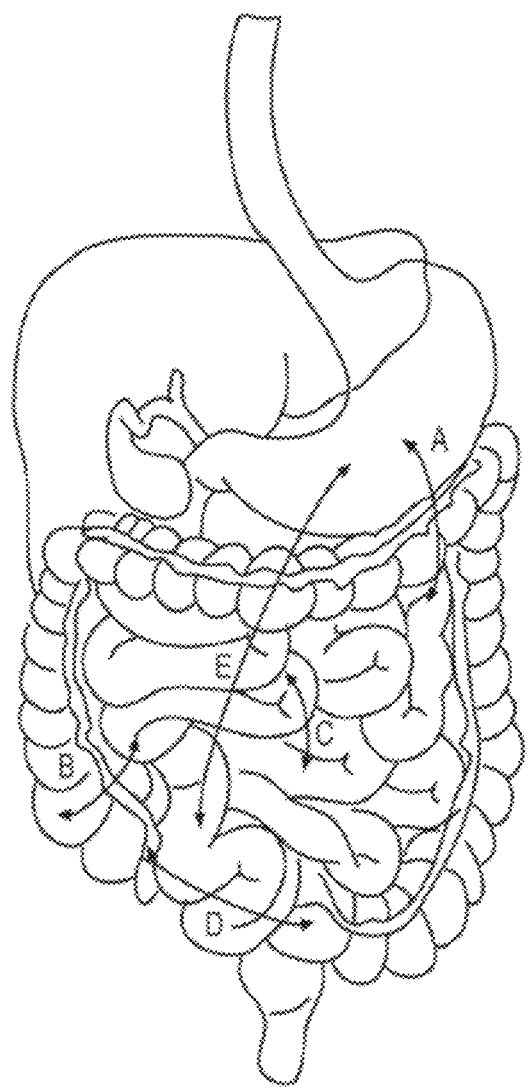
FIG. 2 shows several potential anatomical targets for anastomosis formation, where arrow A is stomach to small intestine, arrow B is small intestine to large intestine, arrow C is small intestine to small intestine, arrow D is large intestine to large intestine, and arrow E is stomach to large intestine, in accordance with various exemplary embodiments.

In some embodiments, self-assembling magnetic devices are used to create a bypass in the gastrointestinal tract. Such reticula can be used for the treatment of a cancerous obstruction, weight loss or bariatrics, or even treatment of diabetes and metabolic disease (e.g., metabolic surgery). FIG. 2 illustrates the variety of gastrointestinal anastomotic targets that may be addressed with the devices of certain exemplary embodiments, such targets include stomach to small intestine (A), stomach to large intestine (E), small intestine to small intestine (C), small intestine to large intestine (B), and large intestine to large intestine (D). Accordingly, exemplary embodiments provide improved devices and techniques for minimally-invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer.

For example, if the hollow body through which the access device 14 may pass is a bowel of the patient, the first portion may be a distal portion of the bowel and the second portion may be a proximal portion of the bowel. The bowel includes any segment of the alimentary canal extending from the pyloric sphincter of the stomach to the anus. In some embodiments, an anastomosis is formed to bypass diseased, mal-formed, or dysfunctional tissues. In some embodiments, an anastomosis is formed to alter the "normal" digestive process in an effort to diminish or prevent other diseases, such as diabetes, hypertension, autoimmune, or musculoskeletal disease. It should be noted that the system may be used for the formation of an anastomosis between a first portion of tissue of the hollow body at the target site and an adjacent tissue of a second hollow body (e.g., portal between the stomach and the gallbladder, the duodenum and the gallbladder, stomach to small intestine, small intestine to large intestine, stomach to large intestine, etc.).

Figure 3:
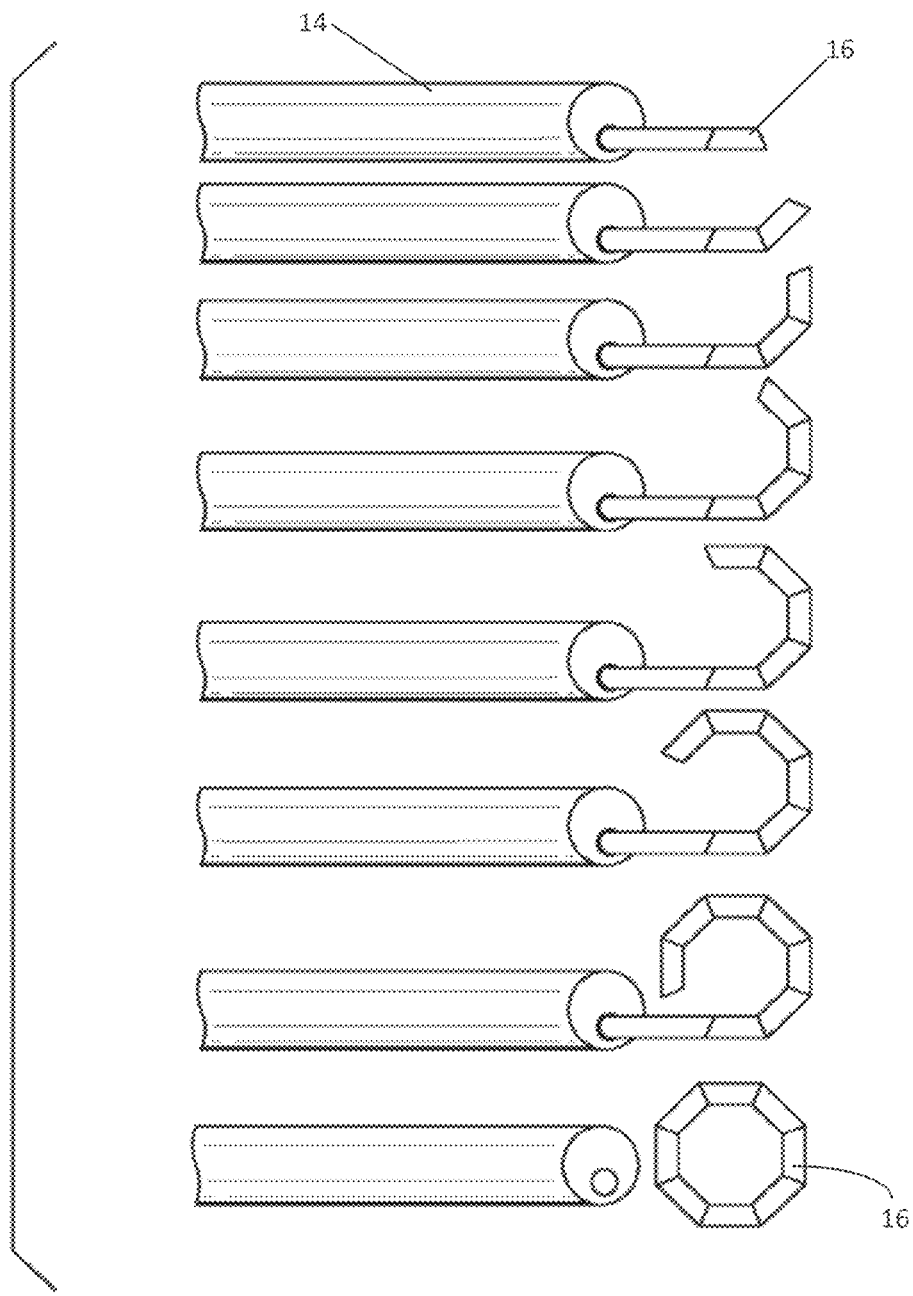
FIG. 3 shows an exemplary magnetic anastomosis device delivered through an endoscope instrument channel such that the individual magnet segments self-assemble into a larger magnetic structure—in this particular case, an octagon, in accordance with various exemplary embodiments.

In an endoscopic procedure, the self-assembling magnetic devices can be delivered using a single endoscope 14. Deployment of a magnetic device 16 is generally illustrated in FIG. 3. As shown, exemplary magnetic anastomosis devices 16 may be delivered through an endoscope 14 such that individual magnet segments self-assemble into a larger magnetic structure—in this particular case, an octagon. In some embodiments, the self-assembling magnets are articulated and can re-assemble into a polygonal structure such as a circle, ellipse, square, hexagon, octagon, decagon, or other geometric structure creating a closed loop. Further, the magnets may be deployed in a straight form or in a curved form. In embodiments, the self-assembling, articulated magnets may be arranged in a closed geometric shape that is a polygon with at least three sides.

When used with the techniques described herein, the devices 16 allow for the delivery of a larger magnetic assemblies than would otherwise be possible via a small delivery conduit, such as in a standard endoscope, if the devices were deployed as a completed assembly. Larger magnet structures, in turn, allow for the creation of larger anastomoses that are more robust, and achieve greater surgical success. For example, in some cases, resulting anastomosis may have a 1:1 aspect ratio relative to the final dimensions of the assembled magnetic devices. However, exemplary embodiments allow for larger aspect ratios (i.e., a larger anastomosis to form relative to the dimensions of the magnetic assemblies). In particular, prior art systems and methods that include the use of magnets for creating anastomosis are generally limited based on the dimensions of the working channel of the scope or catheter used for delivering such magnets, which, in turn, limits the resulting size of the anastomosis. However, the magnetic assembly design of exemplary embodiments overcome such limitations. For example, the design of the magnetic assembly, notably the coupling of multiple magnetic segments to one another via an exoskeleton, allow for any number of segments to be included in a single assembly, and thus the resulting anastomosis has a greater size relative to the dimensions of the working channel of the scope. For example, in some embodiments, the resulting anastomosis may include an aspect ratio in the range of 2:1 to 10:1 or greater.

Because the magnetic devices are radiopaque and echogenic, the devices can be positioned using fluoroscopy, direct visualization (e.g., trans-illumination or tissue indentation), and ultrasound, e.g., endoscopic ultrasound. The devices 16 can also be ornamented with radiopaque paint or other markers to help identify the polarity of the devices during placement.

The magnetic anastomosis devices 16 generally comprise magnetic segments that can assume a delivery conformation and a deployed configuration. The delivery configuration is typically linear so that the device can be delivered to a tissue via a laparoscopic "keyhole" incision or with delivery via a natural pathway, e.g., via the esophagus, with an endoscope 14 or similar device. Additionally, the delivery conformation is typically somewhat flexible so that the device can be guided through various curves in the body. Once the device is delivered, the device will assume a deployed configuration of the desired shape and size by converting from the delivery configuration to the deployed configuration automatically. The self-conversion from the delivery configuration to the deployment configuration is directed by coupling structures that cause the magnetic segments to move in the desired way without intervention. Exemplary self-assembling magnetic anastomosis devices 16, such as self-closing, self-opening, and the like, are described in U.S. Pat. Nos. 8,870,898, 8,870,899, 9,763,664, and 10,182,821, the contents of each of which are incorporated by reference herein in their entirety.

Figure 4A:
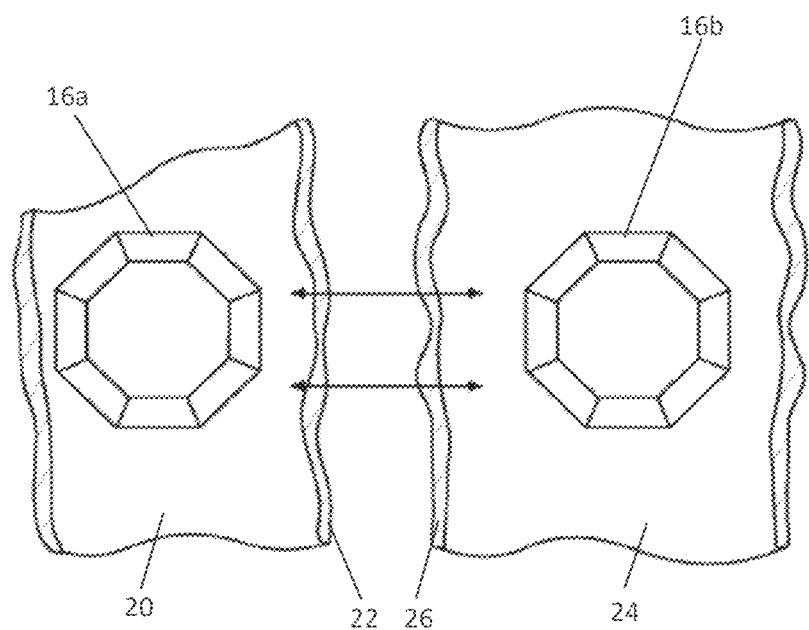
FIG. 4A depicts two magnetic anastomosis devices attracting each other through tissue, in accordance with various exemplary embodiments. As shown, the devices each comprise eight magnetic segments, however alternate configurations are possible. Once the two devices mate, the tissue that is trapped between the devices will necrose, causing an anastomosis to form. Alternatively, the tissue bound by the devices may be perforated after the devices mate to create an immediate anastomosis.

In general, as shown in FIG. 4A, a magnetic anastomosis procedure involves placing a first and a second magnetic assemblies 16a, 16b adjacent to first and second portions 20, 24 of tissues 22, 26, respectively, thus causing the tissues 22 and 26 to come together. Once the two devices 16a, 16b are brought into proximity, the magnetic assemblies 16a, 16b mate and bring the tissues 22, 26 together. With time, an anastomosis of the size and shape of the devices 16a, 16b will form and the devices will fall away from the tissue. In particular, the tissues 22, 26 circumscribed by the devices will be allowed to necrose and degrade, providing an opening between the tissues.

Figure 4B:
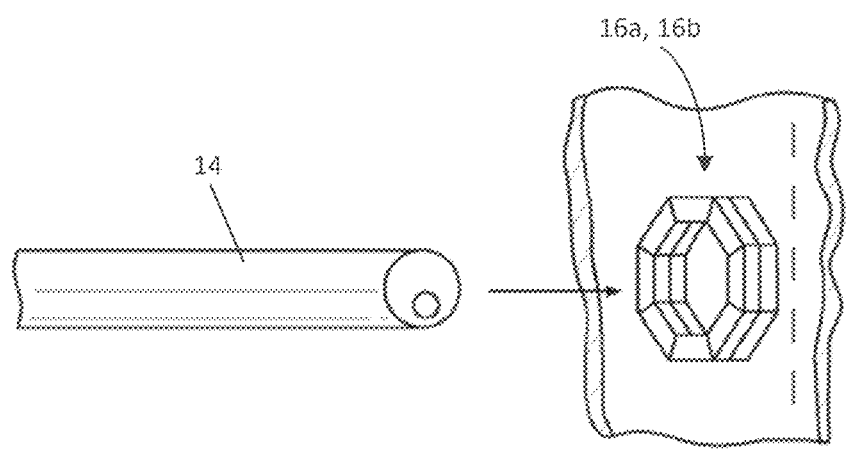
FIG. 4B shows the two magnetic anastomosis devices coupled together by magnetic attraction, capturing the intervening tissue, in accordance with various exemplary embodiments. In some instances, the endoscope can be used to cut through the circumscribed tissue.

Alternatively, because the mated devices 16a and 16b create enough compressive force to stop the blood flow to the tissues 22, 26 trapped between the devices, a surgeon may create an anastomosis by making an incision in the tissues 22, 26 circumscribed by the devices, as shown in FIG. 4B.

Figure 4C:
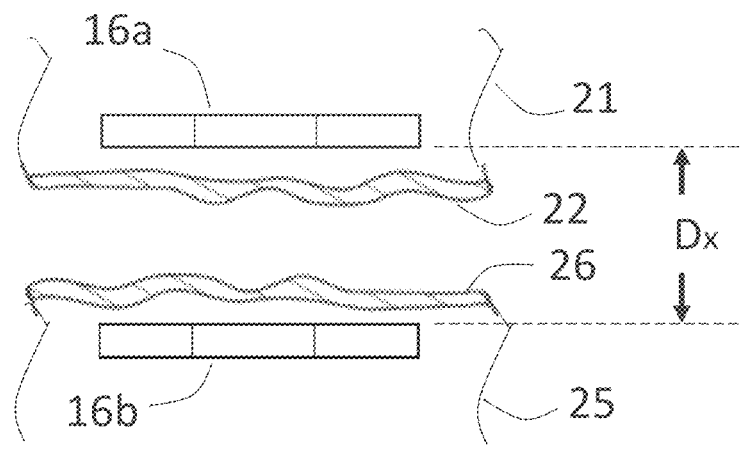
FIG. 4C shows a side view of a magnetic anastomosis procedure involving placing a first and a second magnetic assemblies adjacent to first and second portions of tissues, in accordance with various exemplary embodiments.
Figure 4D:
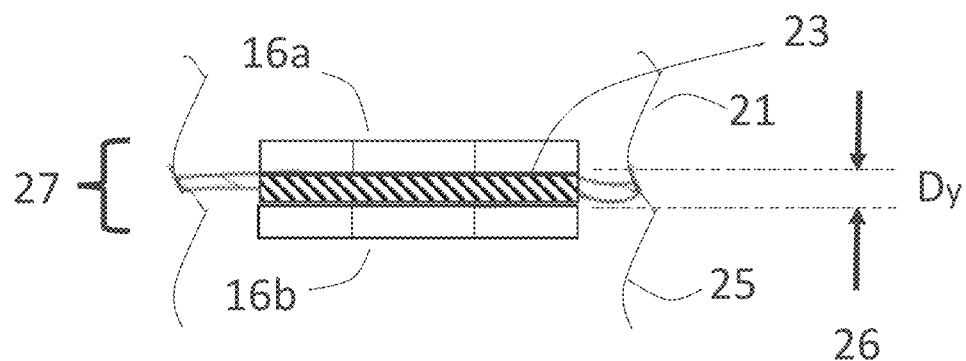
FIG. 4D shows a side view of a magnetic anastomosis procedure after the magnetic assemblies after they have mated, in accordance with various exemplary embodiments.
Figure 4E:
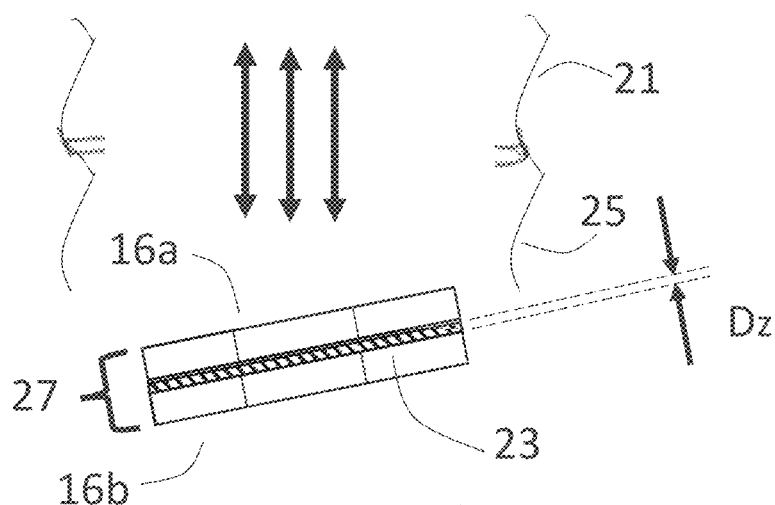
FIG. 4E shows a side view of a magnetic anastomosis procedure after the tissues have necrosed and degraded and fallen away, in accordance with various exemplary embodiments.

FIG. 4C shows a side view of a magnetic anastomosis procedure involving placing a first and a second magnetic assemblies 16a, 16b adjacent to first and second portions of tissues 22, 26, respectively, thus causing the tissues 22 and 26 to come together. FIGS. 4C-4E also indicate side walls 21, 25 of the adjacent channels that will be joined in the anastomosis procedure to create a new channel. In FIG. 4C, the two devices 16a, 16b are brought into proximity. In some embodiments, the distance, Dx, between the two devices 16a, 16b when they have been brought into proximity can be between 10 cm and 1 cm. In some embodiments, the distance Dx is between 8 cm and 3 cm.

FIG. 4D shows a side view of a magnetic anastomosis procedure after the magnetic assemblies 16a, 16b have mated. The mating of the two magnetic assemblies (e.g., magnetic compression anastomosis devices) brings the tissues 22, 26 together, and circumscribes the tissues 22, 26. The tissues 22, 26 become tightly compressed 23 along the surfaces between the magnetic assemblies 16a, 16b. In some embodiments, the distance, Dy, between the two devices 16a, 16b when they have been mated can be between 10 mm and 1 mm. In some embodiments, the distance Dy is between 8 mm and 3 mm.

Once the magnetic assemblies 16a, 16b are mated with the compressed tissues 23 between them, a magnetic stack 27 is formed. The magnetic stack comprises the tissues 22, 26 that have been compressed together 23 between the mated magnetic assemblies 16a, 16b.

With time, an anastomosis of the size and shape of the magnetic devices 16a, 16b will form and the devices will fall away from the tissue. In particular, the compressed tissues 27 circumscribed by the magnetic devices 16a, 16b will be allowed to necrose and degrade, providing an opening between the tissues. At the same time, the side walls 21, 25 of the adjacent channels that will be joined in the anastomosis procedure to create a new channel.

FIG. 4E shows a side view of a magnetic anastomosis procedure after the tissues 22, 26 have necrosed and degraded and fallen away. The magnetic stack 27 is shown moving down the digestive tract of the patient. The side walls 21, 25 of the adjacent channels have been joined to complete the anastomosis procedure and to create a new channel, as indicated by the arrows.

The distance between the magnetic devices 16a, 16b, Dz, once the magnetic stack is about to fall away can be between 10 mm and 1 mm. In some embodiments, the distance Dz is between 2 mm and 0.5 mm. In some embodiments, the distance Dz is between 1.5 mm and 0.75 mm.

The changes in the distance between the magnetic device 16a, 16b can be used as an indicator of the progress of the anastomosis procedure. That is, as the distance narrows from Dx at the time of bringing the magnetic devices into proximity, through the distance Dy at the time of the magnetic devices mating, to the distance Dz at the time of the magnetic devices falling away, the distance between the magnetic devices has narrowed such that Dx>Dy>Dz. In some embodiments, the time of the falling away of the magnetic stack corresponding to the opening of the anastomosis can be predicted from the rate of the narrowing of the distance D, as well as the thickness of D.

While the figures and structures of the disclosure are primarily concerned with annular or polygonal structures, it is to be understood that the delivery and construction techniques described herein can be used to make a variety of deployable magnetic assemblies. For example, self-assembling magnets can re-assemble into a polygonal structure such as a circle, ellipse, square, hexagon, octagon, decagon, or other geometric structure creating a closed loop. The devices may additionally include handles, suture loops, barbs, and protrusions, as needed to achieve the desired performance and to make delivery (and removal) easier. Yet still, in other embodiments, such as magnetic assembly 200 of FIG. 6, a magnetic assembly may comprise a pair of magnetic segments generally arranged in a linear alignment with one another (e.g., aligned in an end-to-end fashion) and coupled together via a flexible exoskeleton element.

Figure 5A:
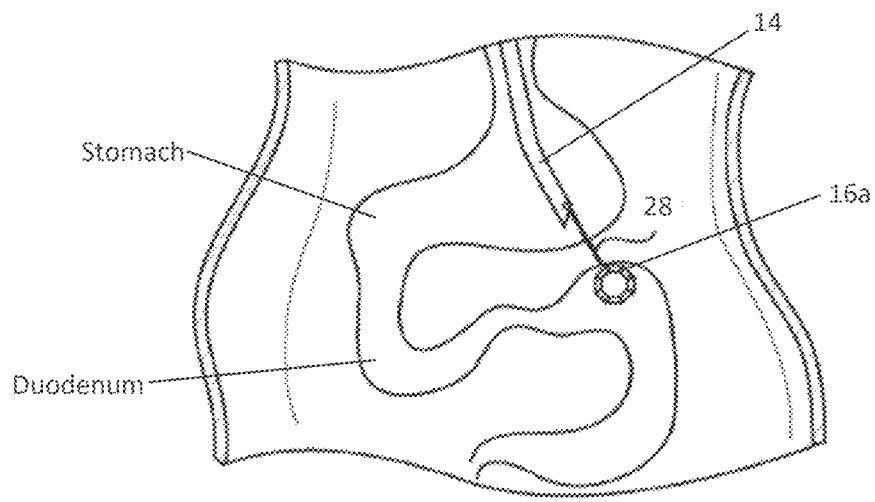
FIG. 5A shows the needle delivering a first magnetic device into a first portion of the hollow body at the target site, in accordance with various exemplary embodiments.
Figure 5B:
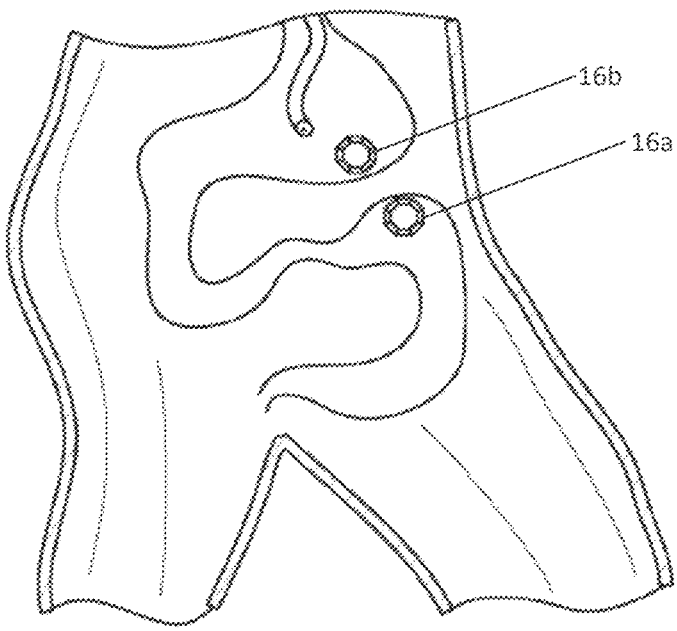
FIG. 5B shows subsequent deployment to of a second magnetic device into a second portion of the hollow body adjacent to the target site, in accordance with various exemplary embodiments.

As previously described, the self-assembling magnetic anastomosis devices can be delivered to the target site via the access device 14. For example, as shown in FIG. 5A, the access device 14 may include a delivery needle 28 (e.g., an aspiration needle) used to deliver the first magnetic anastomosis device 16a into the lower small intestine (through the puncture), which is then followed by deployment to of a second magnetic device 16b into the upper small intestine at a location on the tissue adjacent to the target site (shown in FIG. 5B). It should be noted that the delivery can be guided with fluoroscopy or endoscopic ultrasound. Following self-assembly, these small intestine magnetic devices 16a, 16b couple to one another (e.g., magnetically attracted to one another) through a defined tissue area of the combined thickness of a wall of the tissues at the target site and exert compressive forces on the defined area to form the anastomosis.

Figure 6:
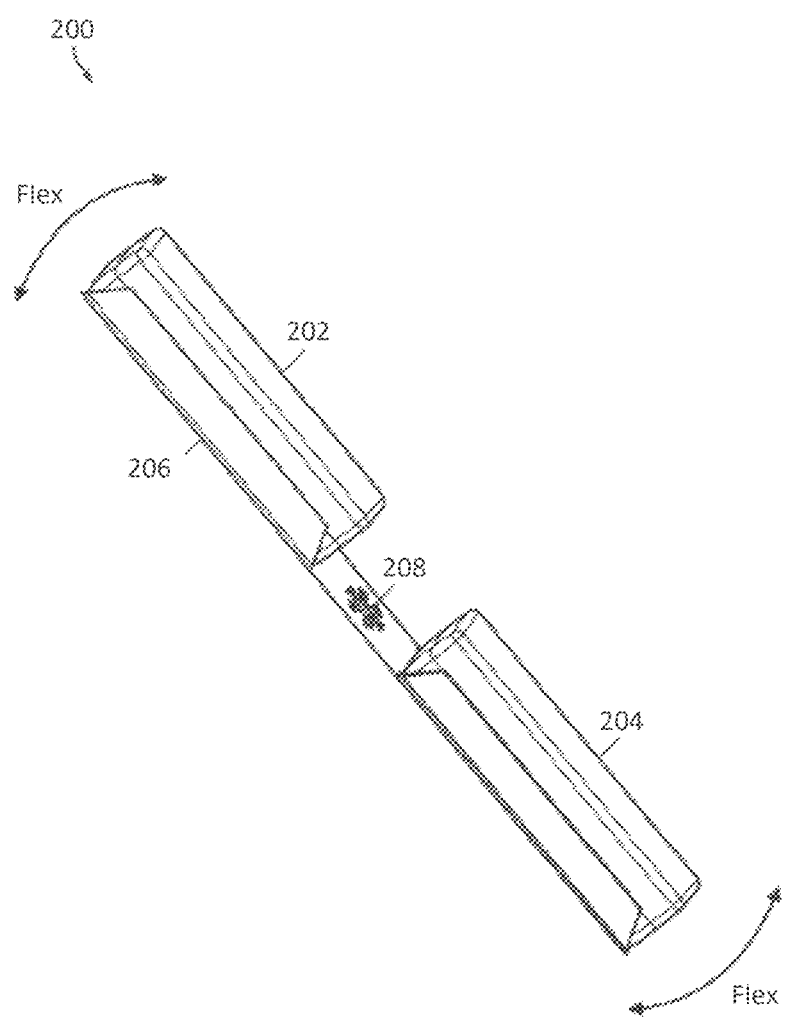
FIG. 6 illustrates a perspective view of another embodiment of a magnetic assembly, in accordance with various exemplary embodiments.

FIG. 6 illustrates a perspective view of another embodiment of a magnetic assembly 200 consistent with the present disclosure. The magnetic assembly 200 comprises a pair of magnetic segments 202, 204 generally arranged in a linear alignment with one another (e.g., aligned in an end-to-end fashion) and coupled together via a flexible exoskeleton element 206. The segments 202, 204 are spaced apart via a central portion 108 of the exoskeleton 206. The central portion 208 may include a connection member for receiving a corresponding connection member of a placement device to assist in delivery of the magnetic assembly 200. The exoskeleton may be made from a resilient material that will retain its shape after deformation, such as a polymer or metal alloy. In some embodiments, the metal alloy will comprise nickel, such as nitinol. Exemplary exoskeleton embodiments are described in U.S. Pat. Nos. 8,870,898, 8,870,899, 9,763, 664, the contents of each of which are incorporated by reference herein in their entirety.

The magnetic assembly 200 is configured to be delivered and deployed at a target site via a delivery device 14. As previously described, exemplary embodiments provide improved devices and techniques for minimally-invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer. More specifically, exemplary embodiments provide a system including a delivery device 100 for introducing and delivering, via a minimally-invasive technique, a pair of magnetic assemblies between adjacent organs to bridge walls of tissue of each organ together to thereby form a passage therebetween (i.e., an anastomosis). The delivery device 14 is particularly useful in delivering the pair of magnetic assemblies to a target site within the gastrointestinal tract to thereby form anastomosis between gastric and gall bladder walls to provide adequate drainage from the gallbladder when blockage is occurring (due to disease or other health-related issues).

Upon deployment, each magnetic assembly has a width and a length generally corresponding to a width of a respective segment and a length that is approximately twice the length of each segment. As a result, the pair of magnetic assemblies, when coupled to one another, generally form a substantially linear package and the resulting anastomosis formed may generally be rectangular in shape, but may naturally form a round or oval shape. The resulting anastomosis may have a 1:1 aspect ratio relative to the dimensions of the magnetic assemblies. However, exemplary embodiments allow for larger aspect ratios (i.e., a larger anastomosis to form relative to the dimensions of the magnetic assemblies). In particular, prior art systems and methods that include the use of magnets for creating anastomosis are generally limited based on the dimensions of the working channel of the scope or catheter used for delivering such magnets, which, in turn, limits the resulting size of the anastomosis. The magnetic assembly design overcomes such limitations.

For example, the design of the magnetic assembly, notably the coupling of multiple magnetic segments to one another via an exoskeleton, allow for any number of segments to be included in a single assembly, and thus the resulting anastomosis has a greater size relative to the dimensions of the working channel of the scope. For example, in some embodiments, the resulting anastomosis may include an aspect ratio in the range of 2:1 to 10:1 or greater. As described earlier, anastomosis may include a substantially two-dimensional shape. That is, the magnetic assemblies may take the shape of a polygon having three or more sides, up to and including octagons (e.g., eight sided polygon 16 as illustrated in FIG. 3.)

Accordingly, the delivery device of the present disclosure produces a low-profile anastomosis that would allow certain complications, particularly those associated with blockage of the common bile duct, to be mitigated. In particular, patients experiencing a blockage of the common bile duct often undergo some sort of procedure to either remove the blockage or allow drainage to provide relief of jaundice/infection and hepatic portal complications. A common procedure is a sphincterotomy, or some sort of draining stent placement procedure. There are procedures which present decompression of the bile duct in a traditional way, but are not possible in a minimally noninvasive manner. Such procedures include, for example, a sphincterotomy, which is not possible due to inability to cannulate the common bile duct, inability to account for anatomical alterations, particularly when during heavily diseased states. Utilizing the magnetic closure force profile as described herein would allow minimal bleeding and create a semi-permanent slit profile. This slit profile would help to resist "sump syndrome" and help to create a drainage point which would remain effectively infection free.

Generally speaking, magnetic compression anastomosis devices are designed and intended to be evacuated from the body such as after an anastomosis has been formed and the device separates from the tissue. It can be very important to be able to monitor the magnetic compression anastomosis device and prove that the magnetic compression anastomosis device is no longer in the body, e.g., without such proof, a person may be barred from having a Magnetic Resonance Imaging (MRI) procedure, which could be harmful to the patient and to others if the device is still in the body. It also could be important to detect that a magnetic compression anastomosis device is being abnormally retained in the body, which, for example, could suggest improper formation of an anastomosis or other problem (e.g., a blockage preventing evacuation).

Figure 7:
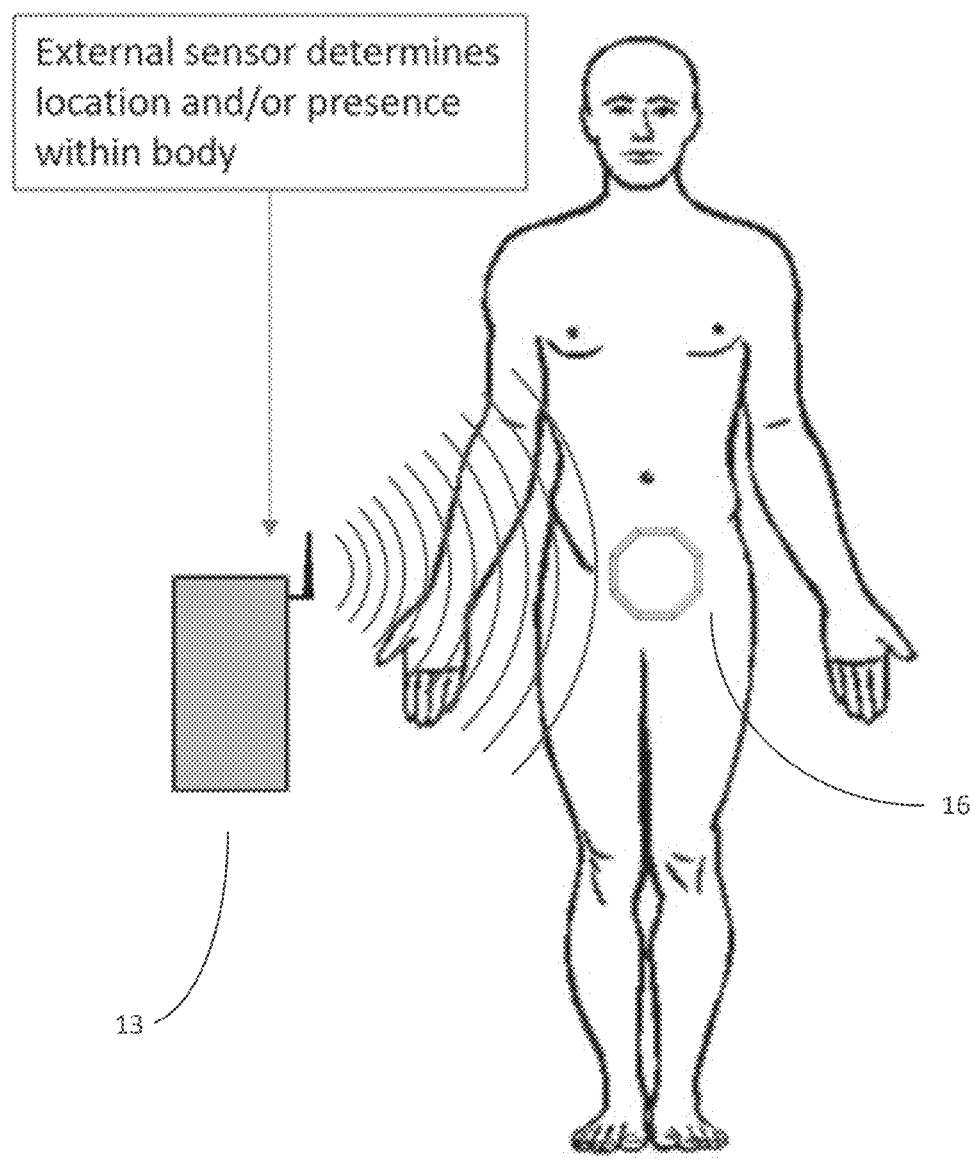
FIG. 7 is a schematic diagram conceptually showing an extracorporeal device (referred to here as an "external detector") that determines location and/or presence of the magnetic compression anastomosis device within the body, in accordance with various exemplary embodiments.

Therefore, certain exemplary embodiments include an extracorporeal device that allows for detecting the presence or absence of a magnetic compression anastomosis device within a body and optionally also detecting the position of the magnetic compression anastomosis device within the body and/or sensing any of various types of parameters associated with the magnetic compression anastomosis device and/or the body. FIG. 7 is a schematic diagram conceptually showing such an extracorporeal device 13 (referred to here as an "detector") that determines location and/or presence of the magnetic compression anastomosis device 16 within the body.

In some cases, sensing of the magnetic compression anastomosis device 16 within the body can be performed without any additional capabilities being added to the magnetic compression anastomosis device, e.g., detecting the magnetic field or magnetic flux produced by the magnetic compression anastomosis device (e.g., using a hall sensor or other magnetic field sensor or magnetometer) or detecting the magnetic compression anastomosis device itself (e.g., using a metal detector, transmitting millimeter wave energy and detecting reflected millimeter wave energy, transmitting ionizing or non-ionizing radiation and detecting reflected energy, or stimulating and detecting magnetic resonance such as by use of magnetic resonance imaging).

Figure 8:
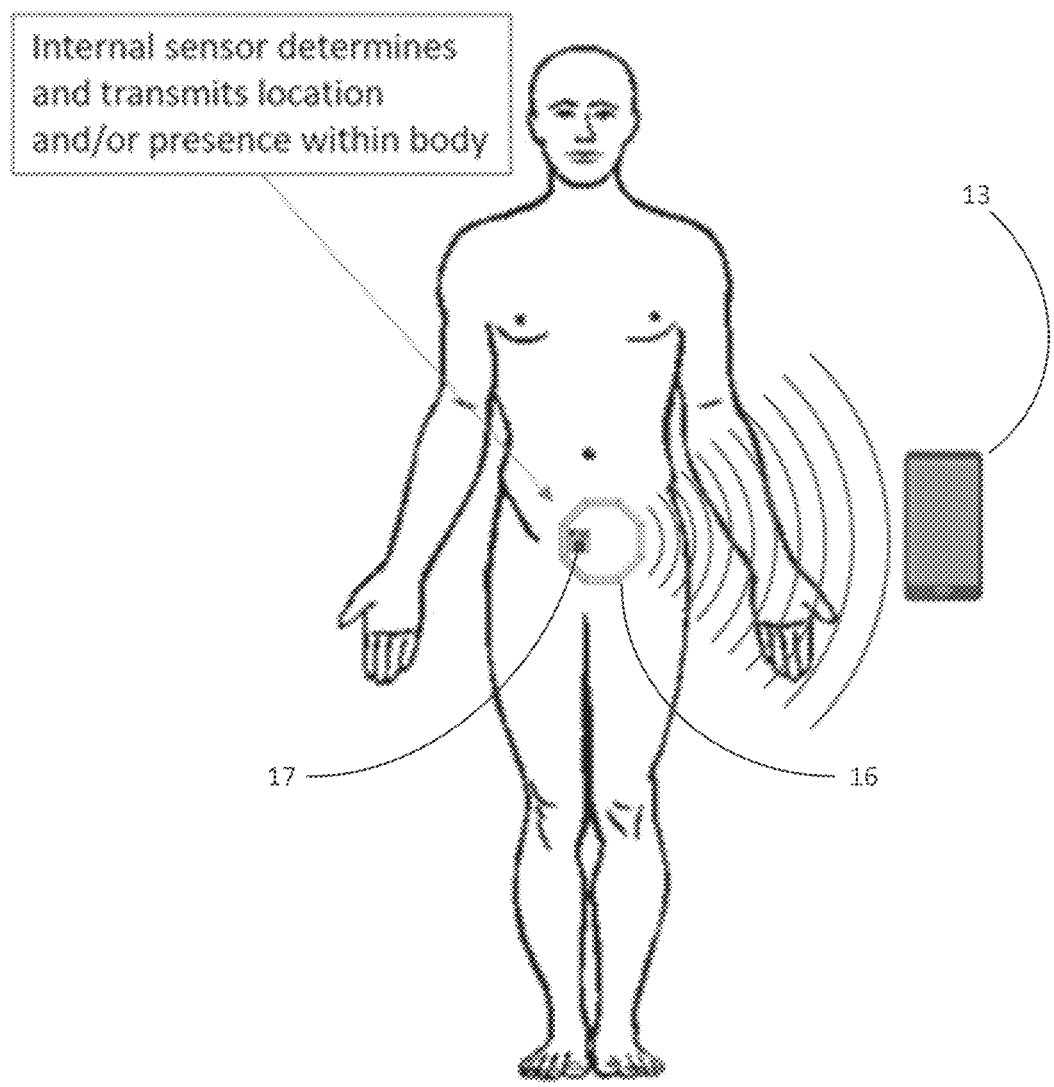
FIG. 8 is a schematic diagram conceptually showing an internal sensor included in a magnetic compression anastomosis device, in accordance with various exemplary embodiments.

Additionally, or alternatively, one or more sensors 17 may be included as part of the magnetic compression anastomosis device 16 (e.g., in or on the device) to produce signals that can be detected by and/or transmitted to the extracorporeal device, e.g., using any of a variety of wireless communication technologies such as, for example, near-field communication technology. FIG. 8 is a schematic diagram conceptually showing an internal sensor 17 which, in this example, determines and transmit location and/or presence within the body. Without limitation, sensors may include some or all of the following:

Accelerometer, e.g., to detect movement of the device, which might be used, for example, to determine an absolute or relative position of the device within the body or to match wave forms of motility to position in body or to detect ejection of the device from the body such as into a toilet or septic system.

Force sensor (e.g., force sensitive resistor or piezoelectric sensor), e.g., to detect forces due to coupling or decoupling of the magnetic compression anastomosis device (e.g., including the strength of coupling), forces exerted on the magnetic compression anastomosis device such as by muscle contractions or tissue swelling, or forces experienced when magnets exit the body.

Light sensor (e.g., a photocell or camera), e.g., to detect visible light levels within the body or to capture images or videos of the magnetic compression anastomosis device or surrounding structures within the body. A light source could be included to provide illumination for capturing images or videos.

Infrared (IR) sensor, e.g., to detect IR light levels and changes of IR light levels within the body.

Pressure sensor, e.g., to detect internal pressure and pressure changes over time and as the device travels through different sections of the body.

Thermometer, thermostat, or other temperature sensor, e.g., to detect body temperature at or about the location of the magnetic compression anastomosis device. This can be used for both medical purposes (e.g., to detect possible fever that could be caused by an infection) or to determine whether or not the magnetic compression anastomosis device has left the body (e.g., detecting a temperature in the range of normal body temperatures might suggest that the device is still in the body, whereas detecting a lower temperature might suggest that the device has left the body). Embodiments could transmit actual sensed temperatures or could cause transmission of a signal based on temperature, e.g., a signal that temperature has gone above a predetermined threshold (e.g., perhaps signaling movement from one body lumen to another or signaling a fever) or that temperature has gone below a predetermined threshold (e.g., perhaps signaling movement from one body lumen to another or signaling that the device has left the body such as sensing a change in temperature from body temperature to room temperature or toilet/septic system temperature). In this regard, the temperature sensor need not sense actual temperature but instead could include a temperature-active device that causes actuation of a signal transmitter when the temperature-active device reaches a predetermined temperature, e.g., a device that changes shape or size based on temperature (e.g., a bimetallic strip, a nitinol wire or strip, etc.) to actuate a mechanical switch, pressure sensitive device, or other actuator to prompt transmission of a signal. Such a temperature sensor/actuator could be simpler and less expensive than a thermometer.

pH sensor, e.g., to detect pH levels and changes in pH levels over time and as the device travels through different sections of the body, which, among other things, can help in determining location of the device within the body (or when the device has been expelled from the body).

Acoustic or sonic sensor, e.g., to detect the acoustic signature and changes in acoustic signatures over time and as the device travels through different sections of the body.

Humidity sensor, e.g., to detect humidity levels (e.g., water vapor) and changes in humidity levels over time and as the device travels through different sections of the body.

Gas sensors, e.g., to detect gas profiles and changes in gas profiles over time and as the device travels through different sections of the body.

Electrical sensor (e.g., an electromyography or EMG sensor), e.g., to detect contact, loss of contact, or quality of contact with a luminal wall or to sense galvanic response, muscle contractions, nerve signals, or other electrical signals.

Heart rate sensor, e.g., to detect presence of a heartbeat, absence of a heartbeat, or heart rate.

Blood pressure sensor.

Blood flow sensor.

Blood chemistry sensor (e.g., oxygen level, CO level, CO2 level, CBC measurements, etc.)

Chemical sensor, e.g., to detect any of a variety of chemistries and gasses such as in the blood or lumen, which could include drug sensors.

Biological sensor, e.g., to detect presences of any of a variety of pathogens, such as pathogens that could cause infection or illness.

Magnetic field sensor (e.g., a hall sensor or other magnetic field sensor or magnetometer), e.g., to sense magnetic fields produced by the magnetic compression anastomosis device and/or by other magnetic or electromagnetic devices used to manipulate the magnetic compression anastomosis device either from inside the body or outside the body.

Additionally or alternatively, other types of active devices and/or sensors could be included in the magnetic compression anastomosis device including actives devices that are remotely controllable from or by the extracorporeal device. For example, without limitation, active devices could provide for such things as remote manipulation of the magnetic compression anastomosis device during deployment and/or after being deployed, tissue stimulation or manipulation, drug delivery, tissue collection/sampling, cauterization, etc. Furthermore, active deices may be included magnetic compression anastomosis devices that would provide proximity information related to the distance between two adjacent magnetic assemblies. That is, active devices that can determine the distance, D, between two magnetic assemblies that are deployed to create an anastomosis opening.

Active devices included in the magnetic compression anastomosis device could be powered in various ways, such as, for example and without limitation, by battery (which may be rechargeable wirelessly from outside the body), by an electromagnetic field transmitted by the extracorporeal device or other external device (e.g., using RFID or magnetoelastic power generation), or by an included fuel cell (e.g., a fuel cell powered by a bodily fluid such as from glucose-containing bodily fluids).

Active devices included in the magnetic compression anastomosis device can contain a microcontrollers and/or other electronic circuitry such as wireless transmitter and/or receiver circuitry. The magnetic compression anastomosis devices may include one or more actuators that are remotely controlled by the tracking device. The tracking device and the actuators and/or sensors may communicate in a two-way fashion, such that each of the tracking device and the actuator and/or sensor may send or receive instructions (e.g., controls).

The actuators may be configured to control formation of the magnetic compression anastomosis device (e.g., converting from a linear delivery arrangement to an annular deployed arrangement), control disassembly of the magnetic compression anastomosis device such as after formation of the anastomosis, control bringing two or more magnetic compression anastomosis devices into proximity with each other, control the mating of two or more magnetic compression anastomosis devices, control decoupling of two or more magnetic compression anastomosis devices, control coupling of two or more magnetic compression anastomosis devices, deploy coupling devices (e.g., mechanical elements used to assist with mechanically coupling two magnetic compression anastomosis devices), control an electromagnet (e.g., to control mating or compressive force of magnetic compression anastomosis device), control a heating element (e.g., to cauterize tissue), control a light (e.g., LED), control an ultrasonic device (e.g., to assist with formation of the anastomosis or separation of the magnetic compression anastomosis devices from the body lumens), control a vibrational device (e.g., to assist with separation of the magnetic compression anastomosis devices from the body lumens), control a mechanical device (e.g., a motorized device, a spring-loaded mechanism, etc.), dispense a chemical (e.g., a medication, a chemical to help with formation of the anastomosis, a chemical to help with disassembly of the magnetic compression anastomosis device, etc.), or actuate a piercing or cutting tool, and the like.

The detectors may detect that two or more magnetic compression anastomosis devices the devices are coupled; The detectors may detect that two or more magnetic compression anastomosis devices the devices are decoupled.

A distance between two or more magnetic compression anastomosis devices may determine the distance between two or more magnetic compression anastomosis devices is reduced as an anastomosis is formed. The distance between two or more magnetic compression anastomosis devices can be used to predict when the devices will fall away and/or exit the body.

It should be noted that the described sensing mechanisms can apply to both single-segment anastomosis devices (e.g., a disk, ring, or other fixed device) and multiple-segment anastomosis devices (e.g., a device with articulating magnetic segments, which may be self-assembling).

Figure 9A:
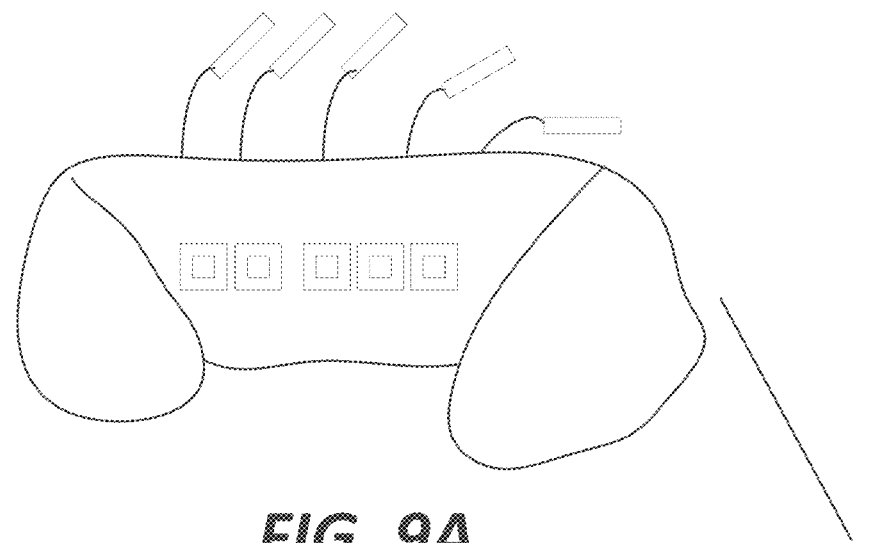
FIG. 9A shows an example of an extracorporeal detector in the form of a detector belt, in accordance with various exemplary embodiments.

FIG. 9A shows a non-limiting example of an extracorporeal detector 13 in the form of a detector belt, in accordance with various exemplary embodiments. Various detectors as described above can be integrated into the detector belt. The detector belt may take the form of a sash, a sling, a backpack, and the like.

Figure 9B:
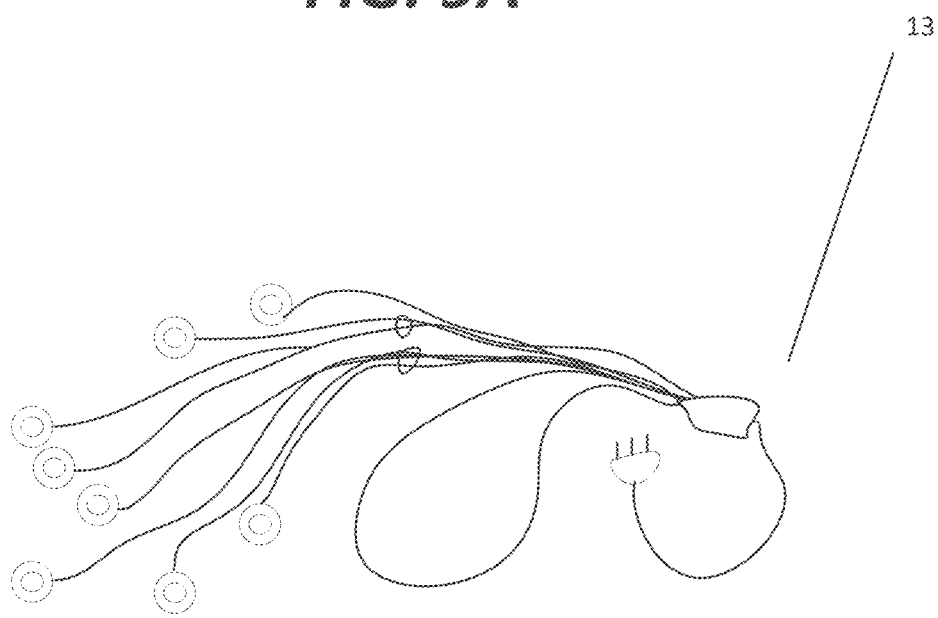
FIG. 9B shows an example of an extracorporeal detector in the form of a detector array, in accordance with various exemplary embodiments.

FIG. 9B shows an example of an extracorporeal detector 13 in the form of a detector array, in accordance with various exemplary embodiments. Various detectors as described above can be integrated into the detector array. The detectors in the array may be positioned around the body to facilitate the highest sensitivity of detection. The detectors may be secured to the body with tape, adhesive, straps, and the like.

Figure 10:
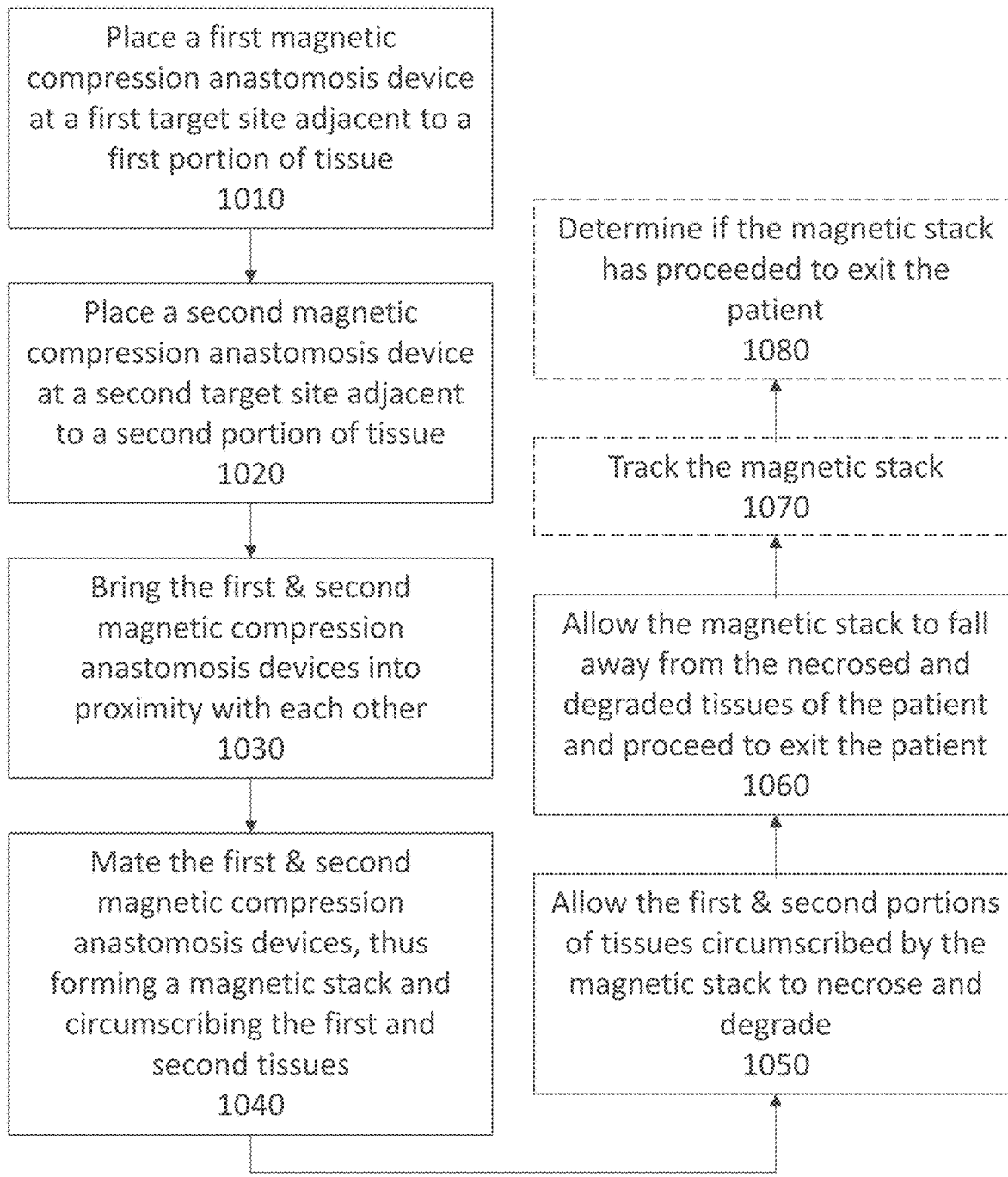
FIG. 10 shows steps of a method of anastomosis between tissues in a patient, in accordance with various exemplary embodiments.

FIG. 10 shows steps of a method of anastomosis between tissues in a patient, in accordance with various exemplary embodiments.

At 1010, a first magnetic compression anastomosis device is placed at a first target site adjacent to a first portion of tissue. The first magnetic compression anastomosis device is placed using a delivery device including an elongate body that includes a lumen extending entirely therethrough and shaped and/or sized to receive and allow one or more magnetic compression anastomosis devices to pass therethrough. The delivery device also includes a distal portion extending from the elongate hollow body. The distal portion includes a pair of arms extending from the elongate hollow body, with each arm terminating at a respective distal end. The respective distal ends converge with one another to form a substantially unitary tip configured to penetrate tissue, and the pair of arms cooperatively form a slot in fluid communication with the lumen of the elongate body.

At 1020, a second magnetic compression anastomosis device is placed at a second target site adjacent to a second portion of tissue. The second magnetic compression anastomosis device is placed using a delivery device including an elongate body that includes a lumen extending entirely therethrough and shaped and/or sized to receive and allow one or more magnetic compression anastomosis devices to pass therethrough. The delivery device also includes a distal portion extending from the elongate hollow body. The distal portion includes a pair of arms extending from the elongate hollow body, with each arm terminating at a respective distal end. The respective distal ends converge with one another to form a substantially unitary tip configured to penetrate tissue, and the pair of arms cooperatively form a slot in fluid communication with the lumen of the elongate body.

The placing of the first and second magnetic compression anastomosis devices at the first and second target sites adjacent to the first and second portions of tissue in the patient may be based on a visual depiction of the location of the first and second target sites as provided by an imaging modality. The imaging modality may include at least one of a medical imaging procedure, wavelength detection, X-ray-based imaging, illumination, computed tomography, radiography, and fluoroscopy, or a combination thereof. The medical imaging procedure comprises ultrasound.

At 1030, the first & second magnetic compression anastomosis devices are brought into proximity with each other. Here, the first magnetic compression anastomosis device and the second magnetic compression anastomosis device are brought into proximity with each other. A first distance between the first magnetic compression anastomosis device and the second magnetic compression anastomosis device can be determined when they are in proximity with each other. The first distance may be between 10 cm and 1 cm.

At 1040, the first & second magnetic compression anastomosis devices are mated to each other, thus forming a magnetic stack and circumscribing the first and second tissues. Mating the first magnetic compression anastomosis device and the second magnetic compression anastomosis device brings the first portion of tissue and the second portion of tissue together, thus forming a magnetic stack. The distance between the first magnetic compression anastomosis device and the second magnetic compression anastomosis device, when they are mated with each other, is between 10 mm and 2 mm. The mated first magnetic compression anastomosis device and the second magnetic compression anastomosis device circumscribe the first tissue and the second tissue. The magnetic stack includes the first magnetic compression anastomosis device at the base of the magnetic stack. The first portion of tissue is stacked on and adjacent to the first magnetic compression anastomosis device. The second portion of tissue is stacked on and adjacent to the first portion of tissue. The second magnetic compression anastomosis device is on top of and adjacent to the second portion of tissue, thus completing the magnetic stack. Accordingly, the first and second tissues are compressed between the first and second magnetic compression anastomosis devices.

At 1050, the first and second portions of tissues circumscribed by the magnetic stack are allowed to necrose and degrade. The first portion of tissue and the second portion of tissue are circumscribed by the first magnetic compression anastomosis device and the second magnetic compression anastomosis device in the magnetic stack to allow the first and second portions of tissue necrose and degrade. A distance between the first magnetic compression anastomosis device and the second magnetic compression anastomosis device, when the first and second tissues are necrosed and degraded, is between 2 mm and 0.5 mm.

At 1050, the magnetic stack is allowed to fall away from the necrosed and degraded tissues of the patient and proceed to exit the patient.

At 1070, optionally, the magnetic stack is tracked. A tracking device is used to track the magnetic stack. The tracking device includes one or more detectors that detect the one or more magnetic compression anastomosis devices. The tracking device also includes one or more sensors disposed in or on the one or more magnetic compression anastomosis devices. The one or more sensors produce an output signal that can be detected by the one or more detectors.

At 1080, optionally, determine if the magnetic stack has proceeded to exit the patient. The determining of whether the magnetic stack has proceeded to exit the patient is made when the one or more detectors fail to detect the magnetic stack, or any of the one or more sensors.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

The invention claimed is:

1. A system for placing and tracking magnetic compression anastomosis devices, the system comprising:
   a magnetic compression anastomosis device;
   a delivery device for delivery of the magnetic compression anastomosis device into a patient, the delivery device comprising:
      an elongate body including a lumen shaped and/or sized to receive and allow the magnetic compression anastomosis device to pass therethrough; and
   a tracking device separate from the magnetic compression anastomosis device, comprising:
      one or more detectors and a wireless transmitter configured to transmit a first wireless signal, wherein the magnetic compression anastomosis device comprises a wireless receiver configured to produce a second wireless signal based on the first wireless signal from the wireless transmitter of the tracking device for detection by the one or more detectors, and wherein the tracking device is configured to differentiate between the magnetic compression anastomosis device remaining inside the patient's body and the magnetic compression anastomosis device having left the patient's body based at least in part on the second wireless signal.

2. The system of claim 1, wherein the second wireless signal is a reflection of the first wireless signal.

3. The system of claim 1, wherein the second wireless signal is a response to the first wireless signal in accordance with a wireless communication protocol, optionally wherein the wireless communication protocol includes at least one of a near-field communication (NFC) protocol, a radio frequency identification (RFID) protocol, or a Bluetooth protocol.

4. The system of claim 1, wherein the wireless receiver is powered by the first wireless signal to at least produce the second wireless signal.

5. The system of claim 1, wherein the tracking device is configured to determine whether the magnetic compression anastomosis device remains within the patient's body or has left the patient's body based on presence or absence of detection of the second wireless signal.

6. The system of claim 1, wherein the tracking device is further configured to track location of the magnetic compression anastomosis device within the patient's body based on the second wireless signal, optionally wherein the tracking device is configured to repeatedly determine the location of the one or more magnetic compression anastomosis devices within the patient's body.

7. The system of claim 1, wherein the one or more detectors are configured to be attached to or worn on the patient's body, optionally wherein the one or more detectors comprise a wearable sash or detector array.

8. The system of claim 1, wherein the magnetic compression anastomosis device further comprises one or more actuators that are remotely controllable via wireless communications received via the wireless receiver from the wireless transmitter of the separate tracking device, optionally wherein the one or more actuators comprise at least one of a remotely controllable piercing or cutting tool; a remotely controllable heating element; a remotely controllable electromagnet; a remotely controllable coupling device; a remotely controllable chemical dispenser; a remotely controllable device to assist with formation of the magnetic compression anastomosis device within the patient's body; a remotely controllable device to assist with disassembly of the magnetic compression anastomosis device within the patient's body; a remotely controllable light; a remotely controllable ultrasonic or vibrational device; a remotely controllable mechanical device; a remotely controllable motorized device; or a remotely controllable spring-loaded device.

9. The system of claim 1, wherein:
   the magnetic compression anastomosis device further comprises a temperature sensor coupled to the wireless receiver, wherein the second wireless signal includes information based on the temperature sensor; and
   the tracking device is further configured to determine whether the magnetic compression anastomosis device remains within the patient's body or has left the patient's body based on the information.

10. The system of claim 9, wherein the information includes at least one of:
   a temperature; or
   a signal that temperature has gone above or below a predetermined threshold.

11. A method for placing and tracking magnetic compression anastomosis devices, the method comprising:
   delivering a magnetic compression anastomosis device into a patient's body using a delivery device comprising an elongate body including a lumen shaped and/or sized to receive and allow the magnetic compression anastomosis device to pass therethrough; and
   tracking the magnetic compression anastomosis device using a tracking device separate from the magnetic compression anastomosis device and comprising one or more detectors and a wireless transmitter configured to transmit a first wireless signal, wherein the magnetic compression anastomosis device comprises a wireless receiver configured to produce a second wireless signal based on the first wireless signal from the wireless transmitter of the tracking device for detection by the one or more detectors, and wherein the tracking device is configured to differentiate between the magnetic compression anastomosis device remaining inside the patient's body and the magnetic compression anastomosis device having left the patient's body based at least in part on the second wireless signal.

12. The method of claim 11, wherein the second wireless signal is a reflection of the first wireless signal.

13. The method of claim 11, wherein the second wireless signal is a response to the first wireless signal in accordance with a wireless communication protocol, optionally wherein the wireless communication protocol includes at least one of a near-field communication (NFC) protocol, a radio frequency identification (RFID) protocol, or a Bluetooth protocol.

14. The method of claim 11, wherein the wireless receiver is powered by the first wireless signal to at least produce the second wireless signal.

15. The method of claim 11, wherein determining whether the magnetic compression anastomosis device remains within the patient's body or has left the patient's body is based on presence or absence of detection of the second wireless signal.

16. The method of claim 11, wherein the tracking device is further configured to track location of the magnetic compression anastomosis device within the patient's body based on the second wireless signal, optionally wherein the tracking device is configured to repeatedly determine the location of the one or more magnetic compression anastomosis devices within the patient's body.

17. The method of claim 11, wherein the one or more detectors are configured to be attached to or worn on the patient's body, optionally wherein the one or more detectors comprise a wearable sash or detector array.

18. The method of claim 11, wherein the magnetic compression anastomosis device further comprises one or more actuators that are remotely controllable via wireless communications received via the wireless receiver from the wireless transmitter of the separate tracking device, optionally wherein the one or more actuators comprise at least one of a remotely controllable piercing or cutting tool; a remotely controllable heating element; a remotely controllable electromagnet; a remotely controllable coupling device; a remotely controllable chemical dispenser; a remotely controllable device to assist with formation of the magnetic compression anastomosis device within the patient's body; a remotely controllable device to assist with disassembly of the magnetic compression anastomosis device within the patient's body; a remotely controllable light; a remotely controllable ultrasonic or vibrational device; a remotely controllable mechanical device; a remotely controllable motorized device; or a remotely controllable spring-loaded device.

19. The system of claim 11, wherein:
the magnetic compression anastomosis device further comprises a temperature sensor coupled to the wireless receiver, wherein the second wireless signal includes information based on the temperature sensor; and
the tracking device is further configured to determine whether the magnetic compression anastomosis device remains within the patient's body or has left the patient's body based on the information.

20. The system of claim 19, wherein the information includes at least one of:
a temperature; or
a signal that temperature has gone above or below a predetermined threshold.

* * * * *